United States Patent
Liu et al.

(10) Patent No.: US 10,831,324 B2
(45) Date of Patent: Nov. 10, 2020

(54) TOUCH PANEL AND FABRICATION METHOD THEREOF, TOUCH DISPLAY SCREEN AND FABRICATION METHOD THEREOF

(71) Applicant: BOE Technology Group Co., Ltd., Beijing (CN)

(72) Inventors: Lina Liu, Beijing (CN); Meizhu Zheng, Beijing (CN); Yuanyuan Li, Beijing (CN); Hualing Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 180 days.

(21) Appl. No.: 16/053,405

(22) Filed: Aug. 2, 2018

(65) Prior Publication Data
US 2019/0187830 A1 Jun. 20, 2019

(30) Foreign Application Priority Data

Dec. 15, 2017 (CN) .......................... 2017 1 1350960

(51) Int. Cl.
*G06F 3/044* (2006.01)
(52) U.S. Cl.
CPC .... *G06F 3/044* (2013.01); *G06F 2203/04102* (2013.01); *G06F 2203/04103* (2013.01); *G06F 2203/04105* (2013.01); *G06F 2203/04107* (2013.01)

(58) Field of Classification Search
None
See application file for complete search history.

(56) References Cited

U.S. PATENT DOCUMENTS

| | | | |
|---|---|---|---|
| 2010/0308844 A1* | 12/2010 | Day | G06F 3/045 |
| | | | 324/663 |
| 2017/0038641 A1* | 2/2017 | Yamazaki | G02F 1/133555 |
| 2017/0315645 A1* | 11/2017 | Park | H01L 51/0097 |

* cited by examiner

*Primary Examiner* — Matthew Yeung
(74) *Attorney, Agent, or Firm* — Nath, Goldberg & Meyer; Joshua B. Goldberg

(57) ABSTRACT

The present disclosure provides a touch panel, including: a flexible substrate including a first region, a second region and a bendable region between the first region and the second region; a first touch sensing layer provided in the first region of the flexible substrate, configured to sense a touch position and connected to a flexible circuit board; a second touch sensing layer provided in the second region of the flexible substrate and configured to sense a touch pressure; and a signal line provided in the bendable region of the flexible substrate and having a first end extending to the first region to be connected to the flexible circuit board and a second end extending to the second region to be connected to the second touch sensing layer.

18 Claims, 4 Drawing Sheets

TOUCH PANEL AND FABRICATION METHOD THEREOF, TOUCH DISPLAY SCREEN AND FABRICATION METHOD THEREOF

CROSS-REFERENCE TO RELATED APPLICATION

This application claims the benefit of priority to Chinese Patent Application No. 201711350960.0 filed on Dec. 15, 2017, the contents of which are incorporated herein in their entirety by reference.

TECHNICAL FIELD

The present disclosure relates to the field of display technology, and particularly relates to a touch panel and a fabrication method thereof, a touch display screen and a fabrication method thereof.

BACKGROUND

With the development of portable electronic terminal devices, especially the rapid development of mobile phones and tablet technology, more and more new technologies are applied to these terminal devices. 3D touch technology, which is used for sensing the pressure of a touch so as to perform a corresponding operation based on a difference in pressure, is now receiving more and more attention. Thus, at present, some terminal devices need to have both a 2D touch function that senses a touch position, and a 3D touch function that senses a touch pressure. In this way, it is possible to identify each touch of a user, sense the pressure of the touch and give different feedback depending on the magnitude of the pressure.

SUMMARY

The present disclosure provides a touch panel and a fabrication method thereof, a touch display screen and a fabrication method thereof.

The touch panel provided in the present disclosure includes: a flexible substrate, including a first region, a second region and a bendable region between the first region and the second region; a first touch sensing layer provided in the first region of the flexible substrate and connected to a flexible circuit board; a second touch sensing layer provided in the second region of the flexible substrate; and a signal line provided in the bendable region of the flexible substrate and having a first end extending to the first region to be connected to the flexible circuit board and a second end extending to the second region to be connected to the second touch sensing layer; wherein one of the first touch sensing layer and the second touch sensing layer is configured to sense a touch position, and the other of the first touch sensing layer and the second touch sensing layer is configured to sense a touch pressure.

Optionally, the first touch sensing layer includes: a first electrode layer, a second electrode layer and a first insulation layer between the first electrode layer and the second electrode layer.

Optionally, one of the first electrode layer and the second electrode layer serves as a driving electrode, and the other of the first electrode layer and the second electrode layer serves as a sensing electrode.

Optionally, in the second region, an auxiliary electrode layer is provided between the flexible substrate and the second touch sensing layer, and a second insulation layer is provided between the auxiliary electrode layer and the second touch sensing layer.

Optionally, the auxiliary electrode layer and the first electrode layer are disposed in a same layer.

Optionally, the second insulation layer and the first insulation layer are disposed in a same layer.

Optionally, the second touch sensing layer includes a third electrode layer and a fourth electrode layer which are insulated from each other.

Optionally, in the bendable region, only a third insulation layer is formed between the flexible substrate and the signal line; the third insulation layer is disposed in the same layer as the first insulation layer and the second insulation layer.

Optionally, the fourth electrode layer includes a module mid-frame that is grounded.

Optionally, a buffer insulation layer is provided between the third electrode layer and the fourth electrode layer and configured to have different deformations when subjected to different pressures.

Optionally, the buffer insulation layer includes a foam layer.

Optionally, a copper and graphite layer for heat dissipation and avoiding static electricity and an adhesive layer for bonding adjacent layers are provided between the buffer insulation layer and the module mid-frame.

The touch display screen provided in the present disclosure includes a display module and a touch panel, and the touch panel is the touch panel provided in the present disclosure.

Optionally, the display module includes a first surface and a second surface opposite to each other, the first surface is adhered, in the first region of the flexible substrate of the touch panel, to a surface of the flexible substrate without the first touch sensing layer, and the second surface is adhered, in the second region of the flexible substrate of the touch panel, to a surface of the flexible substrate without the second touch sensing layer.

The fabrication method of a touch panel provided in the present disclosure includes steps of:

providing a flexible substrate, the flexible substrate including a first region, a second region and a bendable region between the first region and the second region;

forming a first touch sensing layer in the first region of the flexible substrate, and forming a second touch sensing layer in the second region of the flexible substrate, one of the first touch sensing layer and the second touch sensing layer being configured to sense a touch position, the other of the first touch sensing layer and the second touch sensing layer being configured to sense a touch pressure, and the first touch sensing layer being connected to a flexible circuit board; and forming a signal line in the bendable region of the flexible substrate, the signal line having a first end extending to the first region of the flexible substrate to be connected to the flexible circuit board and a second end extending to the second region of the flexible substrate to be connected to the second touch sensing layer.

Optionally, the steps of forming the first touch sensing layer, the second touch sensing layer and the signal line include:

forming a conductive material layer on the flexible substrate, and forming a first electrode layer of the first touch sensing layer and an auxiliary electrode layer by one patterning process, the auxiliary electrode layer being in the second region of the flexible substrate;

forming an insulation material layer; and forming a conductive material layer, and forming a second electrode layer of the first touch sensing layer, a third electrode layer of the second touch sensing layer and the signal line by one patterning process.

The fabrication method of a touch display screen provided in the present disclosure includes steps of:

providing a display module and the touch panel provided in the present disclosure;

adhering a surface, on which the first touch sensing layer is not formed, of the flexible substrate of the touch panel in the first region to a first surface of the display module by alignment;

bending the bendable region of the flexible substrate of the touch panel; and adhering a surface, on which the second touch sensing layer is not formed, of the flexible substrate of the touch panel in the second region to a second surface of the display module by alignment, the second surface being opposite to the first surface.

Optionally, the second touch sensing layer of the touch panel includes a third electrode layer, a fourth electrode layer and a buffer insulation layer between the third electrode layer and the fourth electrode layer, and the fabrication method of the touch display screen further includes steps of:

forming the buffer insulation layer on the third electrode layer of the touch panel on the second surface of the display module; and mounting a module mid-frame that is grounded as the fourth electrode layer on the buffer insulation layer.

Optionally, the alignment is performed by a mark alignment method.

DETAILED DESCRIPTION

To make those skilled in the art better understand the technical solutions of the present disclosure, a touch panel and a fabrication method thereof, a touch display screen and a fabrication method thereof provided in the present disclosure will be further described in detail below in conjunction with the accompanying drawings and the specific implementations.

Figure 1:
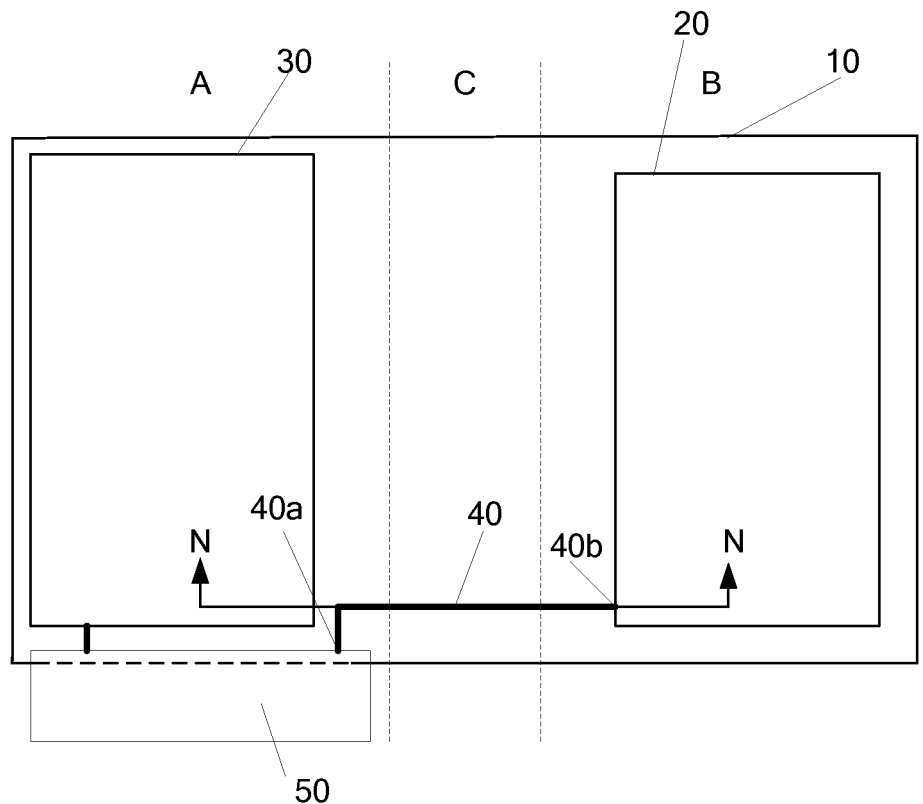
FIG. 1 is a top view of a touch panel provided in an embodiment of the present disclosure.
Figure 2A:
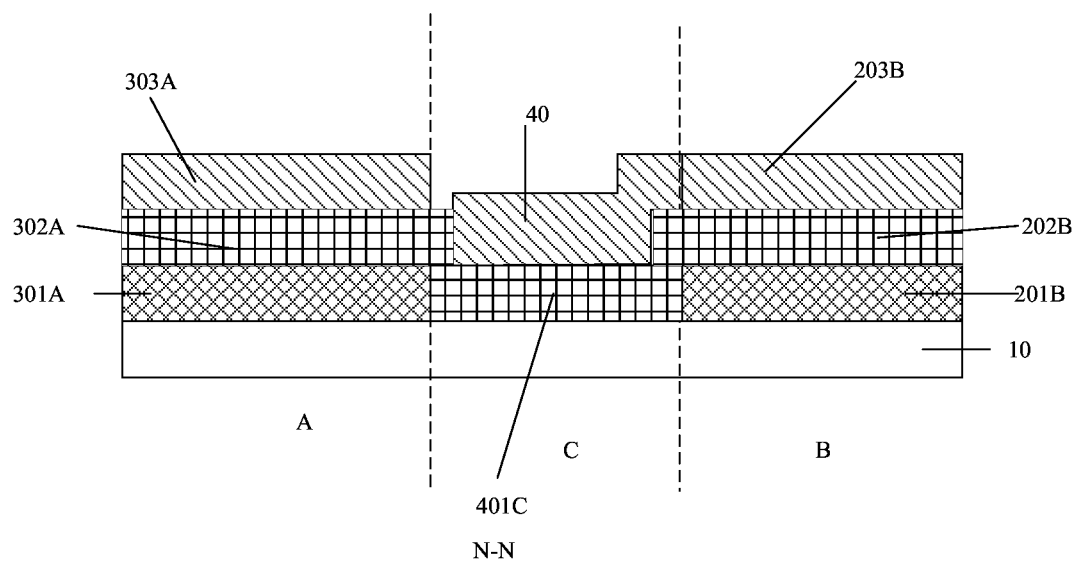
FIG. 2a is a cross-sectional view taken along line N-N in FIG. 1.
Figure 2B:
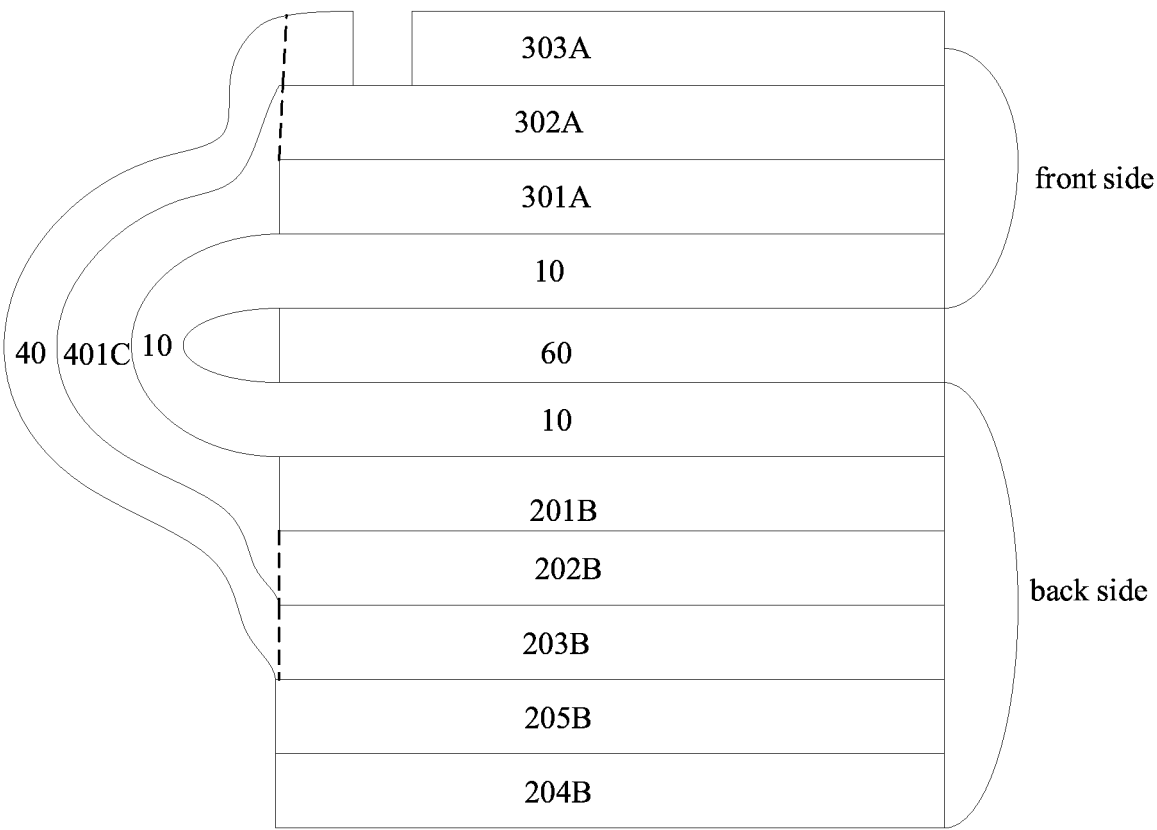
FIG. 2b is a schematic diagram illustrating that the touch panel shown in FIG. 1 and a display module are assembled together.

FIG. 1 is a top view of a touch panel provided in an embodiment of the present disclosure; FIG. 2a is a cross-sectional view taken along line N-N in FIG. 1; FIG. 2b is a schematic diagram illustrating that the touch panel shown in FIG. 1 and a display module are assembled together. Referring to FIGS. 1, 2a and 2b, the touch panel provided in the embodiment of the present disclosure includes a flexible substrate 10 including a first region A, a second region B and a bendable region C between the first region A and the second region B. A first touch sensing layer 30 is provided in the first region A of the flexible substrate 10, and a second touch sensing layer 20 is provided in the second region B of the flexible substrate 10. One of the first touch sensing layer 30 and the second touch sensing layer 20 is used for sensing a touch position, thus achieving a 2D sensor function; and the other of the first touch sensing layer 30 and the second touch sensing layer 20 is used for sensing a touch pressure, thus achieving a 3D sensor function. Each of the first touch sensing layer 30 and the second touch sensing layer 20 includes a driving electrode and a sensing electrode and is configured to determine a touch position or a touch pressure according to a change in capacitance of a capacitor formed between the driving electrode and the sensing electrode when a touch occurs. A signal line 40 is provided in the bendable region C of the flexible substrate 10. When the touch panel provided in the embodiment of the present disclosure is applied, the bendable region C may be bent such that the first region A and the second region B are on the front and back surfaces of the display module 60, respectively. Herein, the front surface of the display module refers to a display surface of the display module, and the back surface of the display module refers to a surface of the display module opposite to the display surface.

Hereinafter, description will be given by taking the case that the first touch sensing layer 30 is used for achieving the 2D sensor function and the second touch sensing layer 20 is used for achieving the 3D sensor function as an example, but the present disclosure is not limited thereto. It can be understood that the first touch sensing layer 30 may be used for achieving the 3D sensor function and the second touch sensing layer 20 may be used for achieving the 2D sensor function.

A first end 40a of the signal line 40 extends to the first region A to be connected to a flexible circuit board 50 (i.e., FPC), and a second end 40b of the signal line 40 extends to the second region B to be connected to the second touch sensing layer 20. The first touch sensing layer 30 is connected to the flexible circuit board 50 (i.e., FPC) in the first region A.

In the touch panel provided in the embodiment of the present disclosure, the first end of the signal line in the bendable region of the flexible substrate extends to the first region to be connected to the flexible circuit board in the first region together with the first touch sensing layer; the second end of the signal line extends to the second region to be connected to the second touch sensing layer. In this way, in application, the first and second regions may be on the front and back surfaces of the display module, respectively, by bending the bendable region. In this case, 3D sensor and 2D sensor on different surfaces of the display module may be connected to one flexible circuit board on one surface of the flexible substrate, so there is no need to additionally provide a connector to connect the 3D sensor to a flexible circuit board FPC on a surface where the 2D sensor is located, and there is no need to provide two flexible circuit boards, thereby reducing costs of the touch panel and the touch display screen. In addition, because both the 3D sensor and the 2D sensor are formed on the flexible substrate, and the flexible substrate is bent when the touch display screen is assembled, one mask may be used to form both the 3D sensor and the 2D sensor in fabrication of the touch panel, which can not only simplify process steps but also reduce the amount of masks to further lower fabrication costs, as compared to the case that the 3D sensor and the 2D sensor are fabricated separately.

In some embodiments, the first touch sensing layer 30 includes: a first electrode layer 301A, a second electrode layer 303A and a first insulation layer 302A between the first electrode layer 301A and the second electrode layer 303A. In this case, the first touch sensing layer 30 is a mutual-capacitive touch sensing layer, in which one of the first electrode layer 301A and the second electrode layer 303A serves as a driving electrode TX and the other of the first electrode layer 301A and the second electrode layer 303A serves as a sensing electrode RX.

Optionally, in the second region B, an auxiliary electrode layer 201B is provided between the flexible substrate 10 and the second touch sensing layer 20, and a second insulation layer 202B is provided between the auxiliary electrode layer 201B and the second touch sensing layer 20. In this case, when the touch panel and the display module are assembled, there is an interval of a certain thickness between the second touch sensing layer 20 (3D sensor) and the display module 60, which can effectively prevent interference with 3D touch capacitance detection caused by the display module when the display module is lit.

Further optionally, the auxiliary electrode layer 201B and the first electrode layer 301A are disposed in a same layer, and the second insulation layer 202B and the first insulation layer 302A are disposed in a same layer. In this way, the auxiliary electrode layer 201B and the first electrode layer 301A may be formed by one patterning process, and the second insulation layer 202B and the first insulation layer 302A may be obtained by forming one insulation material layer, thereby simplifying process steps for fabricating the touch panel and reducing costs. Herein, one patterning process includes steps of coating a photoresist, exposing, developing, and so on.

Optionally, the second touch sensing layer 20 includes a third electrode layer 203B and a fourth electrode layer 204B which are insulated from each other. In this case, the second touch sensing layer 20 is a mutual-capacitive touch sensing layer. Optionally, the fourth electrode layer 204B is a module mid-frame that is grounded, which can reduce a thickness of the touch display screen.

Further optionally, a buffer insulation layer 205B is further provided between the third electrode layer 203B (a pressure sensitive electrode layer) and the module mid-frame (the fourth electrode layer 204B). The buffer insulation layer 205B not only insulates the third electrode layer 203B from the module mid-frame, but also has different deformations when subjected to different pressures to act as a pressure buffer. The buffer insulation layer 205B may be, but is not limited to, a foam layer.

In some embodiments, in the bendable region C, only a third insulation layer 401C is formed between the flexible substrate 10 and the signal line 40. Optionally, the third insulation layer 401C is disposed in the same layer as the first insulation layer 302A and the second insulation layer 202B. In this way, the first insulation layer 302A, the second insulation layer 202B and the third insulation layer 401C may be obtained by forming one insulation material layer, thereby simplifying the fabrication process and lowering costs. In addition, no electrode layer is formed between the third insulation layer 401C and the flexible substrate 10 in the bendable region C, so that the thickness of the bendable region C is small, which facilitates bending.

It should be noted that, in some embodiments, although each of the first touch sensing layer 30 and the second touch sensing layer 20 is a mutual-capacitive touch sensing layer, the present disclosure is not limited thereto. Each of the first touch sensing layer 30 and the second touch sensing layer 20 can also be a self-capacitive touch sensing layer, or a resistive touch sensing layer, as long as 2D touch and 3D touch functions can be achieved.

It should also be noted that, in practical applications, other auxiliary functional layers, such as a copper and graphite layer and an adhesive layer DAT, may also be formed between the buffer insulation layer 205B and the module mid-frame. The copper and graphite layer is used for heat dissipation and avoiding static electricity, and the adhesive layer DAT is used for bonding adjacent layers.

It should be further noted that, in the embodiment of the disclosure, the signal line 40 and the third insulation layer 401C may be made of a flexible material. For example, the insulation layer is made of SiNx, and the signal line 40 is made of ITO, silver nano, cycloolefin polymer COP, or the like. In this way, properties of the signal line 40 and the third insulation layer 401C will not be affected when the touch panel is bent.

Referring to FIGS. 2a and 2b, the present disclosure further provides a touch display screen including a display module and a touch panel that is the touch panel provided in the above embodiments.

In some embodiments, the display module includes a first surface (e.g., front surface) and a second surface (e.g., back surface) which are opposite to each other, the first surface is adhered, in the first region A of the flexible substrate 10 of the touch panel, to a surface of the flexible substrate without the first touch sensing layer 30, and the second surface is adhered, in the second region B of the flexible substrate 10 of the touch panel, to a surface of the flexible substrate without the second touch sensing layer 20.

In addition, the structure of the display module is not particularly limited in the present disclosure. For example, the display module may be an AMOLED display module.

Because the touch display screen provided in the embodiment of the present disclosure includes the touch panel provided in the above embodiment, costs can be lowered, and economic efficiency can be improved.

Figure 3:
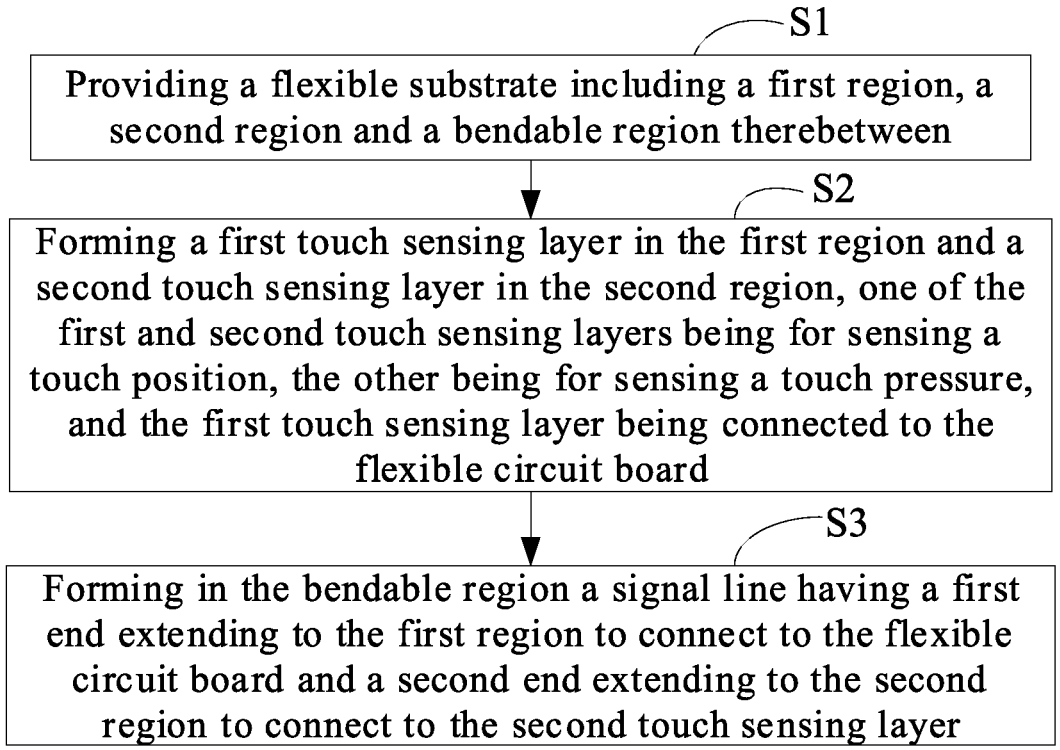
FIG. 3 is a flow chart of a fabrication method of a touch panel provided in an embodiment of the present disclosure.

FIG. 3 is a flow chart of a fabrication method of a touch panel provided in an embodiment of the present disclosure. Referring to FIGS. 3, 2a and 2b, the fabrication method of a touch panel provided in the embodiment of the present disclosure includes steps S1 to S3.

Step S1 includes providing a flexible substrate 10, the flexible substrate 10 including a first region A, a second region B and a bendable region C between the first region A and the second region B.

Step S2 includes forming a first touch sensing layer 30 in the first region A of the flexible substrate 10, and forming a second touch sensing layer 20 in the second region B of the flexible substrate 10, one of the first touch sensing layer 30 and the second touch sensing layer 20 being used for sensing a touch position, the other of the first touch sensing layer 30 and the second touch sensing layer 20 being used for sensing a touch pressure, and the first touch sensing layer 30 being connected to a flexible circuit board 50.

Step S3 includes forming a signal line 40 in the bendable region C of the flexible substrate 10, the signal line 40 having a first end extending to the first region A to be connected to the flexible circuit board 50 and a second end extending to the second region B to be connected to the second touch sensing layer 20.

The touch panel obtained by using the fabrication method of a touch panel provided in the embodiment of the present disclosure is described in the above embodiment, and will not be repeatedly described here.

Figure 4:
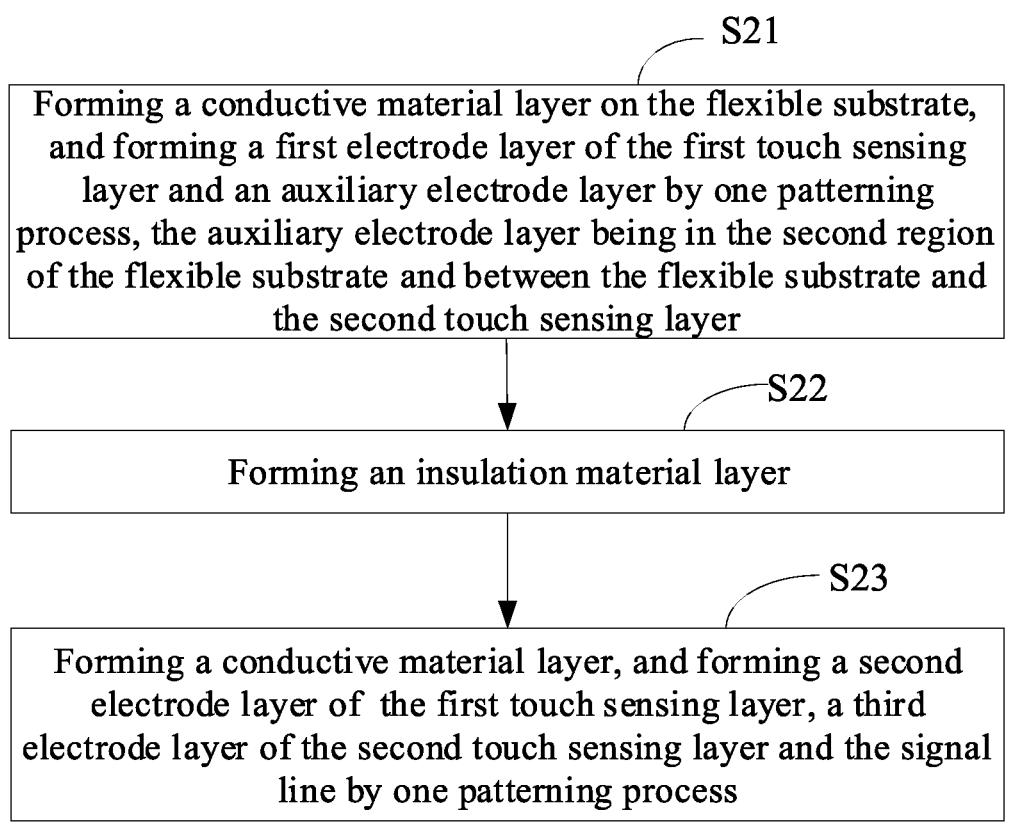
FIG. 4 is a flow chart of steps S2 and S3 in FIG. 3.

Optionally, as shown in FIGS. 4, 2a and 2b, steps S2 and S3 include:

step S21 of forming a conductive material layer on the flexible substrate 10, and forming a first electrode layer 301A of the first touch sensing layer 30 and an auxiliary electrode layer 201B by one patterning process, the auxiliary electrode layer 201B being in the second region B of the flexible substrate 10 and between the flexible substrate 10 and the second touch sensing layer 20;

step S22 of forming an insulation material layer to serve as a first insulation layer 302A, a second insulation layer 202B and a third insulation layer 401C; and step S23 of forming a conductive material layer, and forming a second electrode layer 303A, a third electrode layer 203A of the second touch sensing layer 20 and the signal line 40 by one patterning process.

Figure 5:
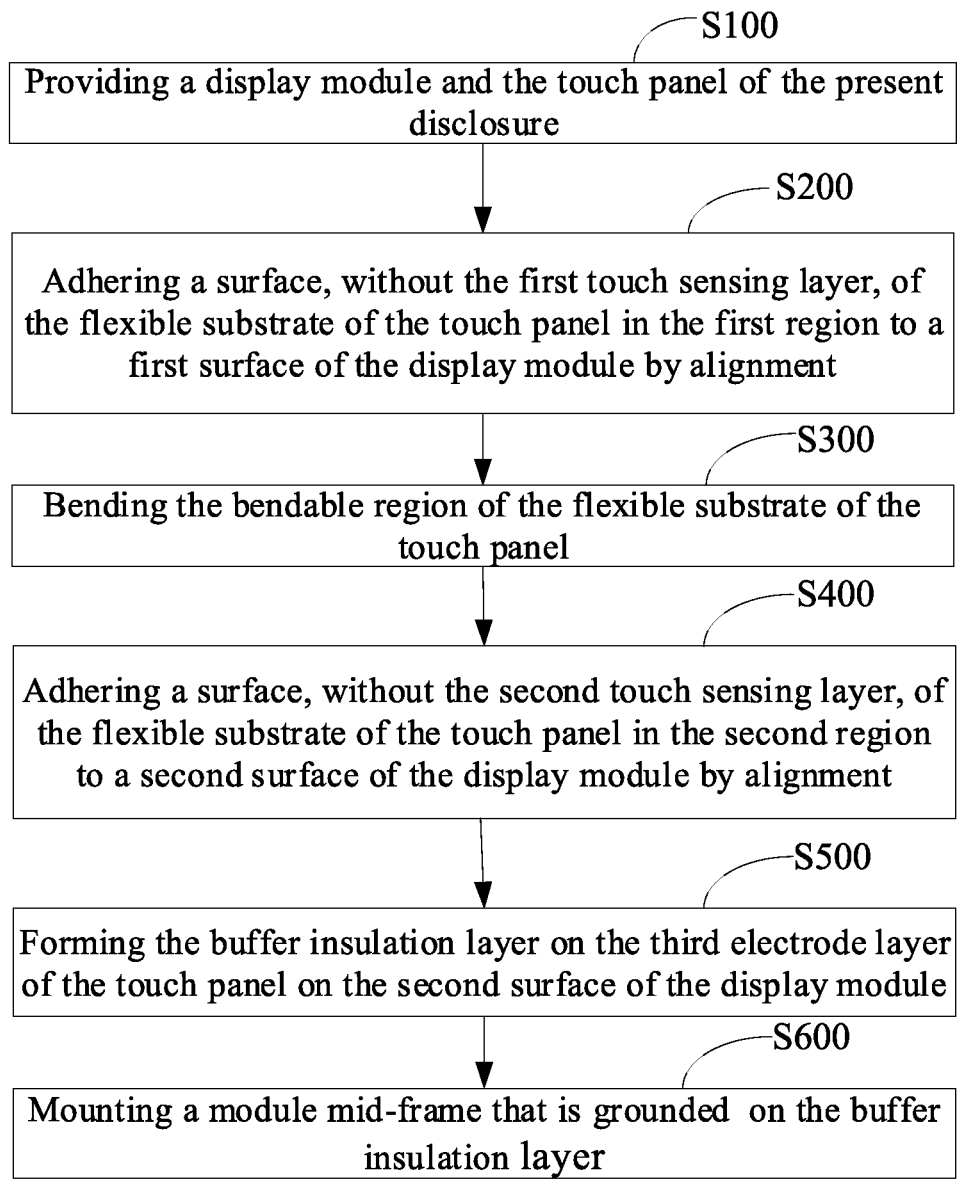
FIG. 5 is a flow chart of a fabrication method of a touch display screen provided in an embodiment of the present disclosure.

FIG. 5 is a flow chart of a fabrication method of a touch display screen provided in an embodiment of the present disclosure. Referring to FIGS. 5, 2a and 2b, the fabrication method of a touch display screen provided in the embodiment of the present disclosure includes steps S100 to S400.

Step S100 includes providing a display module and the touch panel provided in the above embodiment of the present disclosure.

Step S200 includes adhering a surface, on which the first touch sensing layer is not formed, of the flexible substrate of the touch panel in the first region to a first surface of the display module (e.g., the front surface of the display module) by alignment.

Step S300 includes bending the bendable region of the flexible substrate of the touch panel.

Step S400 includes adhering a surface, on which the second touch sensing layer is not formed, of the flexible substrate of the touch panel in the second region to a second surface of the display module (e.g., the back surface of the display module) by alignment, wherein the second surface is opposite to the first surface.

In steps S200 and S400, the alignment is performed by a mark alignment method. Specifically, an alignment mark is set so that the alignment is performed by identifying the alignment mark.

In general, after the flexible substrate in the first region or in the second region is adhered to a corresponding surface of the display module, a cover plate is adhered on the surface. The step of adhering the cover plate may be performed between the two adhering steps, or may be performed after the two adhering steps, which is not limited in the present disclosure.

Optionally, referring to FIGS. 5, 2a and 2b, in the case that the touch panel has the third electrode layer 203B and the fourth electrode layer 204B is a module mid-frame, the fabrication method further includes, after step S400, step S500 of forming a buffer insulation layer 205B on the third electrode layer 203B (pressure sensitive electrode layer) of the touch panel on the second surface of the display module 60; and step S600 of mounting the module mid-frame 204B that is grounded on the buffer insulation layer 205B.

In this way, the module mid-frame 204B that is grounded can replace a grounded electrode layer, thereby reducing a thickness of the touch display screen.

It should be noted that, between steps S500 and S600, other steps may be added to form auxiliary layers with certain auxiliary functions, such as a copper and graphite layer for heat dissipation and avoiding static electricity and an adhesive layer DAT for bonding adjacent layers.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. A touch panel, comprising: a flexible substrate, comprising a first region, a second region and a bendable region between the first region and the second region; a first touch sensing layer, provided in the first region of the flexible substrate, and connected to a flexible circuit board; a second touch sensing layer, provided in the second region of the flexible substrate; and a signal line, provided in the bendable region of the flexible substrate, and having a first end extending to the first region to be connected to the flexible circuit board and a second end extending to the second region to be connected to the second touch sensing layer; wherein one of the first touch sensing layer and the second touch sensing layer is configured to sense a touch position, and the other of the first touch sensing layer and the second touch sensing layer is configured to sense a touch pressure wherein in the second region, an auxiliary electrode layer is provided between the flexible substrate and the second touch sensing layer, and a second insulation layer is provided between the auxiliary electrode layer and the second touch sensing layer.

2. The touch panel of claim 1, wherein the first touch sensing layer comprises:
a first electrode layer, a second electrode layer and a first insulation layer between the first electrode layer and the second electrode layer.

3. The touch panel of claim 2, wherein one of the first electrode layer and the second electrode layer serves as a driving electrode, and the other of the first electrode layer and the second electrode layer serves as a sensing electrode.

4. The touch panel of claim 1, wherein the auxiliary electrode layer and the first electrode layer are disposed in a same layer.

5. The touch panel of claim 4, wherein the second insulation layer and the first insulation layer are disposed in a same layer.

6. The touch panel of claim 1, wherein the second touch sensing layer comprises a third electrode layer and a fourth electrode layer which are insulated from each other.

7. The touch panel of claim 5, wherein in the bendable region, only a third insulation layer is formed between the flexible substrate and the signal line.

8. The touch panel of claim 7, wherein the third insulation layer is disposed in the same layer as the first insulation layer and the second insulation layer.

9. The touch panel of claim 6, wherein the fourth electrode layer comprises a module mid-frame that is grounded.

10. The touch panel of claim 9, wherein a buffer insulation layer is provided between the third electrode layer and the fourth electrode layer and configured to have different deformations when subjected to different pressures.

11. The touch panel of claim 10, wherein the buffer insulation layer comprises a foam layer.

12. The touch panel of claim 10, wherein a copper and graphite layer for heat dissipation and avoiding static electricity and an adhesive layer for bonding adjacent layers are provided between the buffer insulation layer and the module mid-frame.

13. A touch display screen, comprising a display module and a touch panel, wherein the touch panel is the touch panel of claim 1.

14. The touch display screen of claim 13, wherein the display module comprises a first surface and a second surface opposite to each other, the first surface is adhered, in the first region of the flexible substrate of the touch panel, to a surface of the flexible substrate without the first touch sensing layer, and the second surface is adhered, in the second region of the flexible substrate of the touch panel, to a surface of the flexible substrate without the second touch sensing layer.

15. A fabrication method of a touch panel, comprising steps of: providing a flexible substrate, the flexible substrate comprising a first region, a second region and a bendable region between the first region and the second region; forming a first touch sensing layer in the first region of the flexible substrate, and forming a second touch sensing layer in the second region of the flexible substrate, one of the first touch sensing layer and the second touch sensing layer being configured to sense a touch position, the other of the first touch sensing layer and the second touch sensing layer being configured to sense a touch pressure, and the first touch sensing layer being connected to a flexible circuit board; and forming a signal line in the bendable region of the flexible substrate, the signal line having a first end extending to the first region of the flexible substrate to be connected to the flexible circuit board and a second end extending to the second region of the flexible substrate to be connected to the second touch sensing layer wherein the steps of forming the first touch sensing layer, the second touch sensing layer and the signal line comprise: forming a conductive material layer on the flexible substrate, and forming a first electrode layer of the first touch sensing layer and an auxiliary electrode layer by one patterning process, the auxiliary electrode layer being in the second region of the flexible substrate; forming an insulation material layer; and forming a conductive material layer, and forming a second electrode layer of the first touch sensing layer, a third electrode layer of the second touch sensing layer and the signal line by one patterning process.

16. A fabrication method of a touch display screen, comprising steps of:
providing a display module and the touch panel of claim 1;
adhering a surface, on which the first touch sensing layer is not formed, of the flexible substrate of the touch panel in the first region to a first surface of the display module by alignment;
bending the bendable region of the flexible substrate of the touch panel; and
adhering a surface, on which the second touch sensing layer is not formed, of the flexible substrate of the touch panel in the second region to a second surface of the display module by alignment, the second surface being opposite to the first surface.

17. The fabrication method of claim 16, wherein the second touch sensing layer of the touch panel comprises a third electrode layer, a fourth electrode layer and a buffer insulation layer between the third electrode layer and the fourth electrode layer,
the fabrication method further comprises steps of:
forming the buffer insulation layer on the third electrode layer of the touch panel on the second surface of the display module; and
mounting a module mid-frame that is grounded as the fourth electrode layer on the buffer insulation layer.

18. The fabrication method of claim 16, wherein the alignment is performed by a mark alignment method.

* * * * *